United States Patent [19]
Hara

[11] Patent Number: 5,480,001
[45] Date of Patent: Jan. 2, 1996

[54] FRAME STRUCTURE FOR A MOTORCYCLE

[75] Inventor: Ikuo Hara, Saitama, Japan

[73] Assignee: Honda Giken Kogyo Kabushiki Kaisha, Tokyo, Japan

[21] Appl. No.: 325,588

[22] Filed: Oct. 19, 1994

[30] Foreign Application Priority Data

Oct. 19, 1993 [JP] Japan .................................. 5-261326

[51] Int. Cl.$^6$ ........................... B62K 11/02; B62K 25/20
[52] U.S. Cl. ......................... 180/227; 180/219; 180/311
[58] Field of Search ................................... 180/227, 219, 180/311; 280/284

[56] References Cited

U.S. PATENT DOCUMENTS

| | | | |
|---|---|---|---|
| 4,484,652 | 11/1984 | Shiratsuchi et al. | 180/227 |
| 4,556,119 | 12/1985 | Shiratsuchi | 180/227 |
| 4,781,264 | 11/1988 | Matsuzaki et al. | 180/227 |

FOREIGN PATENT DOCUMENTS 3-24394  4/1991  Japan .

*Primary Examiner*—Mitchell J. Hill
*Attorney, Agent, or Firm*—Birch, Stewart, Kolasch & Birch

[57] ABSTRACT

A swing arm in supported with a simple structure by reducing the number of parts and the length of welding. Handling of the swing arm is made easier in a frame structure for a motorcycle or the like wherein the swing arm is pivotably supported at its front end to a rear portion of a body frame. A single main pipe is a component of a body frame composed of a rearwardly extending portion 16a located over an engine and extending rearwardly from a head pipe. A bent portion extends from a rear end of the rearwardly extending portion. A downwardly extending portion extends downwardly from the bent portion. A pair of cross pipes extend laterally and are vertically spaced from each other and are connected at their intermediate portions to the downwardly extending portion. A pair of supporting plates is located on the left and right sides of the downwardly extending portion and are connected to both ends of each of the cross pipes. A swing arm is pivotably supported at its front end to a pivot shaft located between the cross pipes and extends between the supporting plates.

20 Claims, 7 Drawing Sheets

FRAME STRUCTURE FOR A MOTORCYCLE

BACKGROUND OF THE INVENTION

1. Field of the Invention

The present invention relates to an improvement in a frame structure for pivotably supporting a swing arm in a motorcycle or the like wherein an engine is mounted on a body frame having a front end provided with a head pipe for supporting a front suspension, and a swing arm for supporting a rear wheel is pivotably supported at its front end to the body frame at a rear portion thereof behind the engine.

2. Description of Background Art

FIG. 7 illustrates a conventional frame structure for pivotably supporting a swing arm. A pair of left and right pipes 41 are welded to a rear portion of a single main pipe 16' connected to a head pipe 15. A pair of left and right supporting plates 25' are welded both to a pair of left and right down tubes 17' connected to the head pipe 15 and to the pipes 41. A pivot shaft, not shown, for supporting a swing arm, not shown, is provided between the left and right supporting plates 25'.

According to the above conventional structure, the pair of pipes 41 are welded to the single main pipe 16', and the pair of supporting plates 25' are welded both to the pipes 41 and to the pair of down tubes 17'. Accordingly, the length of the welding is large to cause an increase in cost of construction. The shaft working for the connection of the swing arm to the pivot shaft extending between the supporting plates 25' is carried out after connecting all of the parts of the body frame. Accordingly, a unit to be handled in shaft working for the connection of the swing arm to the pivot shaft is large in size, so that the operation of the shaft provided for the connection of the swing arm is not easy.

In Japanese patent publication No. 3-24394 there is disclosed a swing arm supporting structure having a pair of left and right supporting plates connected by three cross members and a pivot shaft provided between the left and right supporting plates. This swing arm supporting structure is fixed to a pair of left and right main pipes and a pair of left and right down tubes. Accordingly, the number of parts is increased.

OBJECTS AND SUMMARY OF THE INVENTION

It is accordingly an object of the present invention to provide a frame structure in a motorcycle or the like which can support a swing arm with a simple structure by reducing the number of parts and the length of welding. The connection of the swing arm to the body frame is made easier.

According to the present invention, there is provided in a motorcycle or the like with an engine mounted on a body frame having a front end provided with a head pipe for supporting a front suspension. A swing arm for supporting a rear wheel is pivotably supported at a front end of the swing arm to a rear portion of the body frame thereof behind the engine. A frame structure is provided wherein the body frame has a single main pipe comprising a rearwardly extending portion located over the engine and extending rearwardly from the head pipe. A bent portion extends from a rear end of the rearwardly extending portion. A downwardly extending portion is located behind the engine and extends downwardly from the bent portion. A pair of cross pipes laterally extend and are vertically spaced from each other and are connected at their intermediate portions to the downwardly extending portion of the main pipe. A pair of supporting plates are located so as to be interposed therebetween the downwardly extending portion of the main pipe which is connected to both ends of each of the cross pipes. The front end of the swing arm is pivotably supported to a pivot shaft located between the cross pipes and extending between the supporting plates.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention as applied to a motorcycle will now be described with reference to the drawings.

Figure 1:
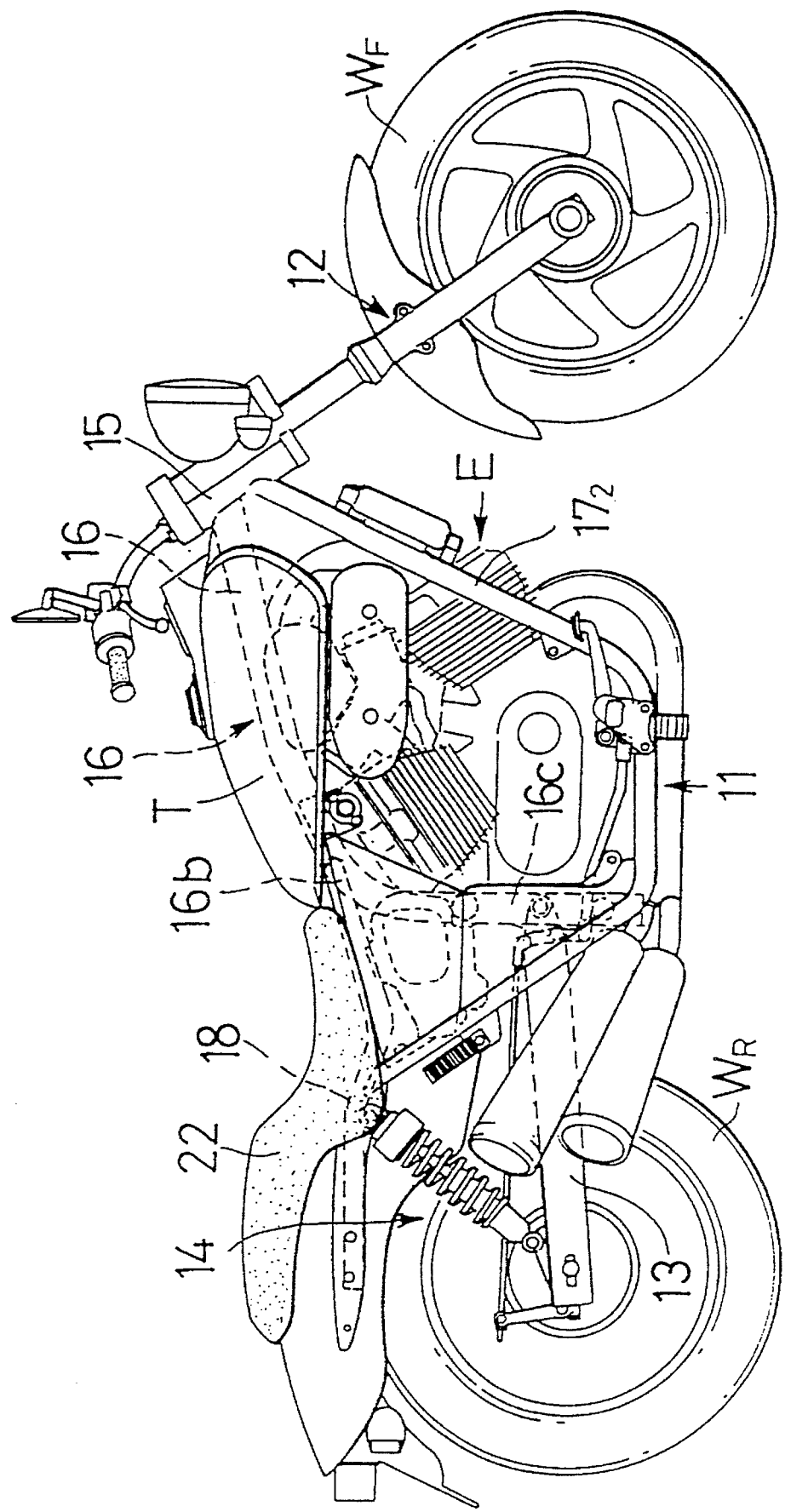
FIG. 1 is a side view of a motorcycle.
Figure 2:
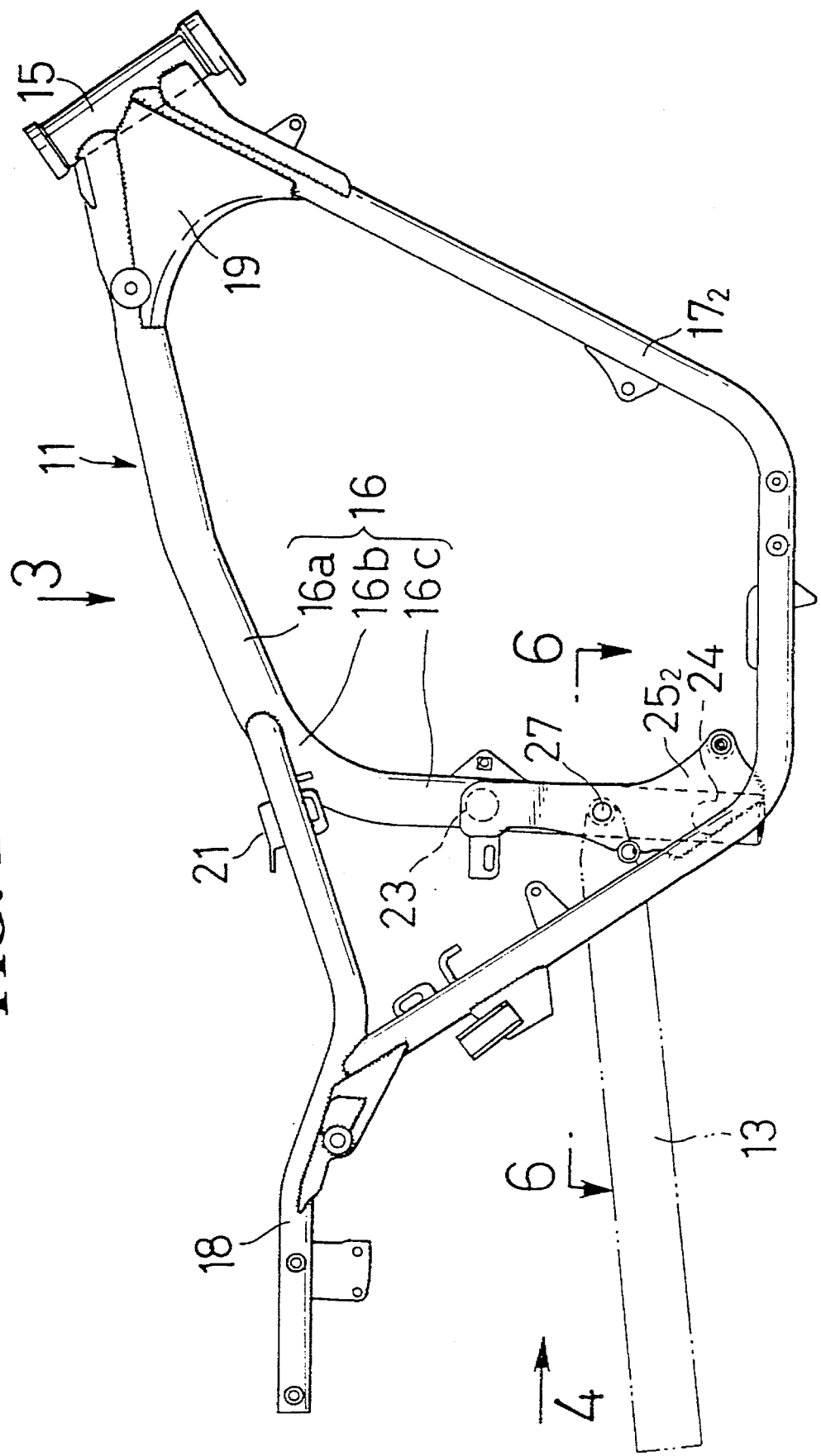
FIG. 2 is a side view of a body frame.
Figure 3:
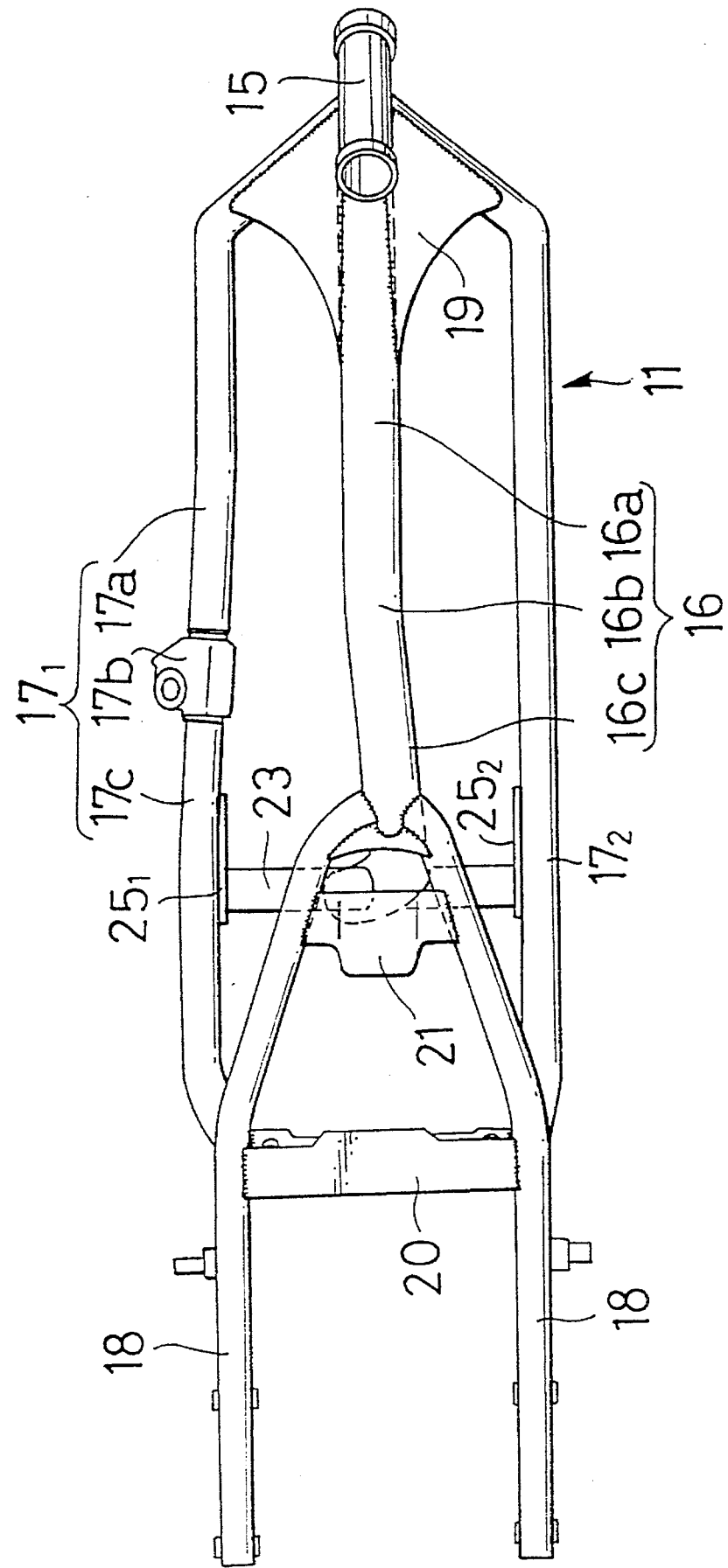
FIG. 3 is a plan view taken in the direction of an arrow 3 in FIG. 2.
Figure 4:
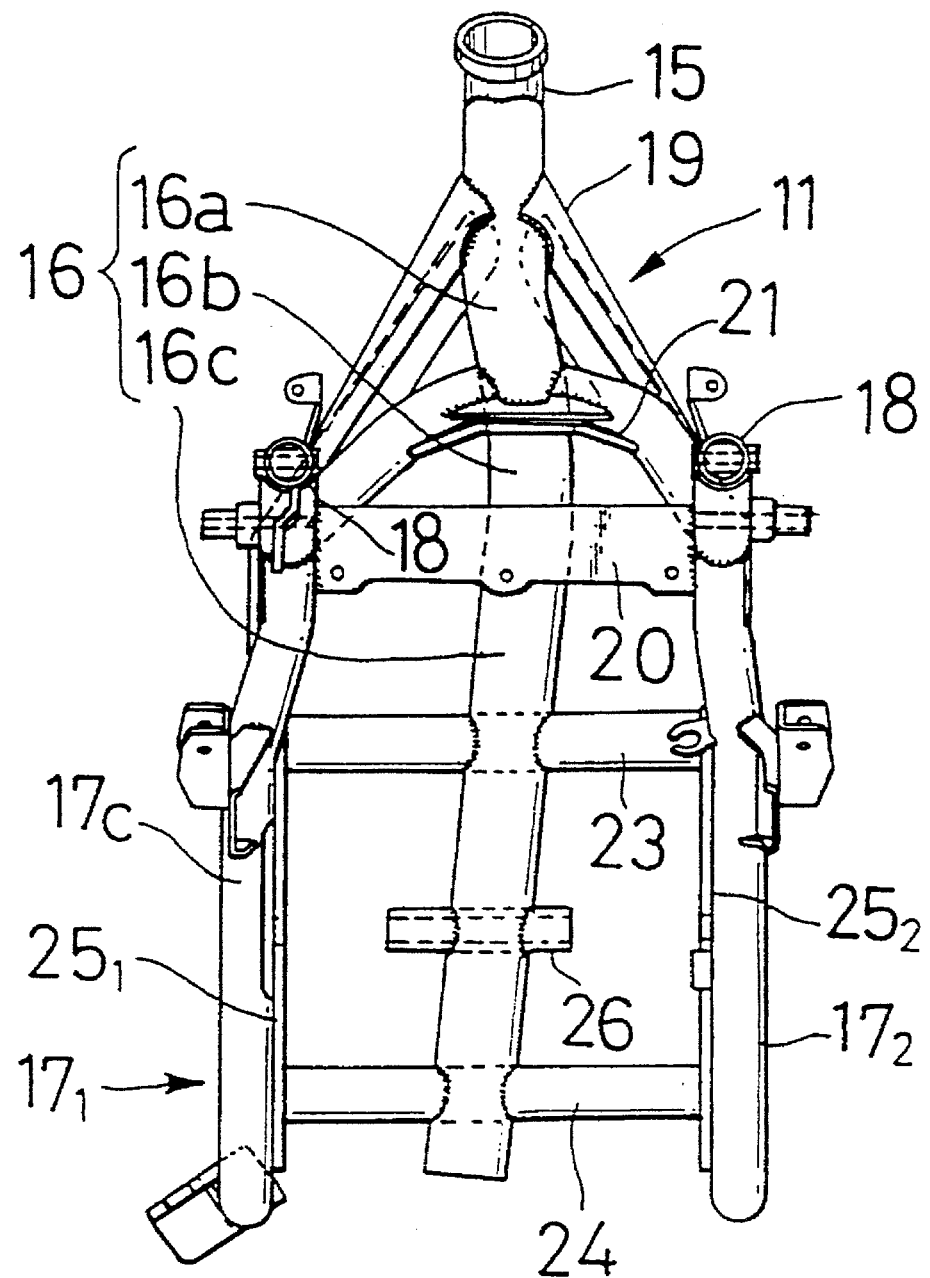
FIG. 4 is a rear view taken in the direction of an arrow 4 in FIG. 2.
Figure 5:
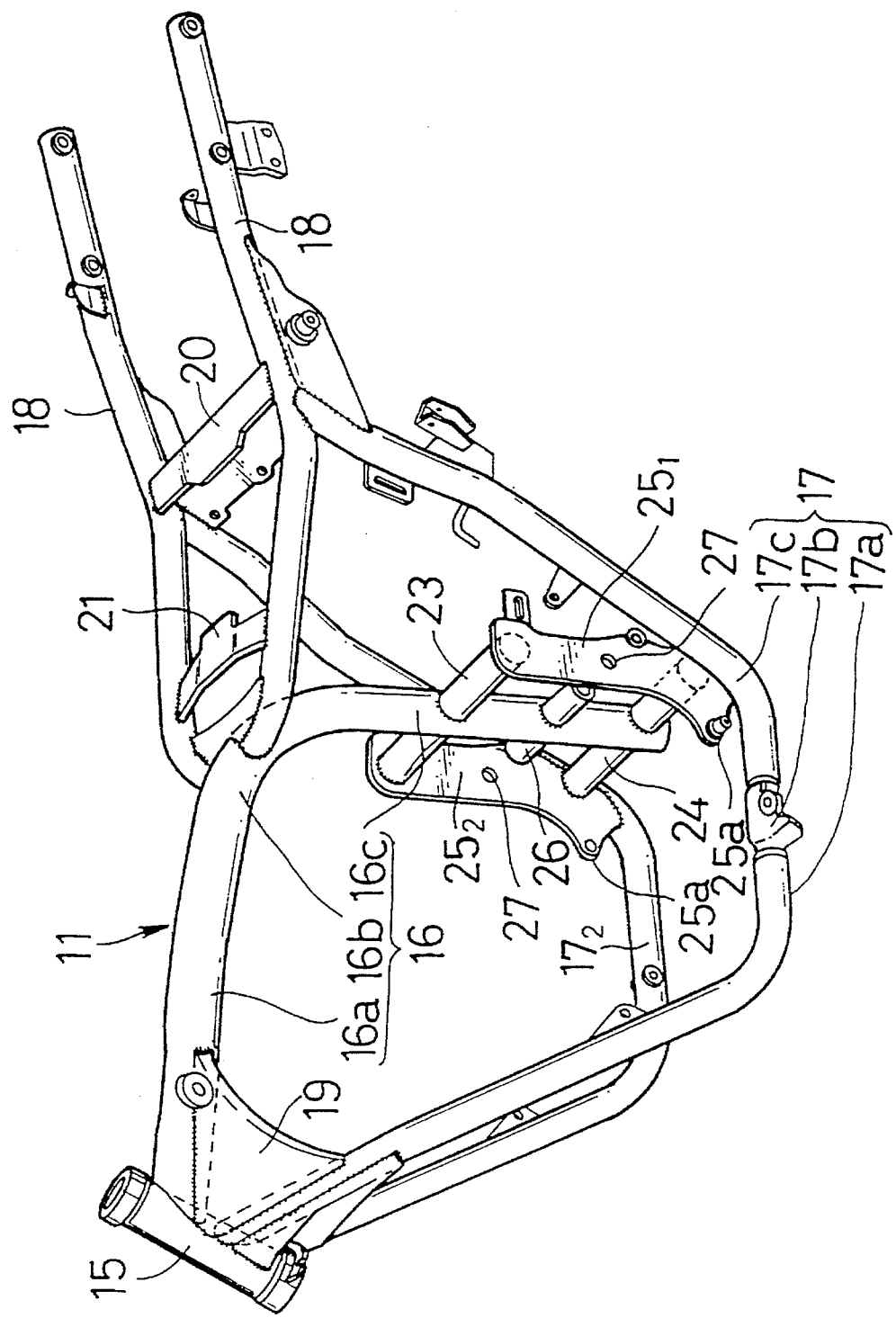
FIG. 5 is a perspective view of the body frame taken from a left front side thereof.

Referring first to FIG. 1, an engine E and a fuel tank T are mounted on a body frame 11 of the motorcycle. A front wheel $W_F$ is suspended through a front suspension 12 to a front end portion of the body frame 11. A rear wheel $W_R$ is supported to a rear end of a swing arm 13 pivotably supported to a rear lower portion of the body frame 11. A shock absorber 14 is interposed between the swing arm 13 and a rear upper portion of the body frame 11.

Referring to FIGS. 2, 3, 4, and 5, the body frame 11 includes a head pipe 15 for supporting the front suspension 12. A single main pipe 16 extends rearwardly from the head pipe 15. A pair of left and right down tubes $17_1$ and $17_2$ are connected to the head pipe 15 and extend below the main pipe 16. A pair of left and right seat rails 18 extending rearwardly from a rear upper portion of the main pipe 16. A joint portion disposed between the head pipe 15, the main pipe 16, and the down tubes $17_1$ and $17_2$ is reinforced by a gusset 19.

The main pipe 16 has a rearwardly extending portion 16a disposed over the engine E and extending rearwardly from the head pipe 15, a bent portion 16b extends from a rear end of the rearwardly extending portion 16a, and a downwardly extending portion 16c is disposed behind the engine E and extends downwardly from the bent portion 16b. Both of the seat rails 18 are welded at their front ends to the bent portion 16b of the main pipe 16. Reinforcing members 20 and 21 extend between the two seat rails 18. As illustrated in FIG. 1, a seat 22 is mounted on both of the seat rails 18. The shock absorber 14 is interposed between the seat rails 18 and the swing arm 13.

The down tube $17_1$ is composed of a first cylindrical portion 17a, a second cylindrical portion 17c, and a connecting member 17b connecting the first and second cylindrical portions 17a and 17c. The down tube $17_1$ has a substantially U-shaped configuration. The first cylindrical portion 17a is inclined downwardly from the head pipe 15, and a front end of the first cylindrical portion 17a is connected to the head pipe 15. The second cylindrical portion 17c is inclined upwardly from the connecting member 17b, and a front end of the second cylindrical portion 17c is connected through the connecting member 17b to a rear end of the first cylindrical portion 17a. A rear end of the second cylindrical portion 17c is connected to one of the two seat rails 18. The connecting member 17b also serves to support a stand, not shown.

The other down tube $17_2$ has basically the same shape as that of the down tube $17_1$, but the down tube $17_2$ is formed as an integral part. A front end of the down tube $17_2$ is connected to the head pipe 15, and a rear end of the down tube $17_2$ is connected to the other seat rail 18.

The main pipe 16, as a component of the body frame 11, includes a pair of upper and lower cross pipes 23 and 24 laterally extending and vertically spaced from each other which are welded at their intermediate portions to the downwardly extending portion 16C of the main pipe 16. A pair of left and right flat supporting plates $25_1$ and $25_2$ are opposed to each other. The downwardly extending portion 16c interposed therebetween is welded to both ends of each of the cross pipes 23 and 24. Both of the cross pipes 23 and 24 are inserted through the downwardly extending portion 16c of the main pipe 16. In this inserted condition, the intermediate portions of the cross pipes 23 and 24 are welded to the downwardly extending portion 16c. The supporting plates $25_2$ and $25_2$ are welded to the down tubes $17_1$ and $17_2$ at their rear lower portions, respectively.

A supporting sleeve 26, inserted through the downwardly extending portion 16c of the main pipe 16, is located between the cross pipes 23 and 24 in a parallel relationship thereto. The supporting sleeve 26 is welded at its intermediate portion to the downwardly extending portion 16c. The supporting plates $25_1$ and $25_2$ includes through holes 27 aligned with opposite end openings of the supporting sleeve 26. An inner diameter of the supporting sleeve 26 is somewhat larger than the diameter of each through hole 27.

The supporting plates $25_1$ and $25_2$ are integrally formed at a front lower portion thereof with supporting portions 25a for supporting the engine E.

Figure 6:
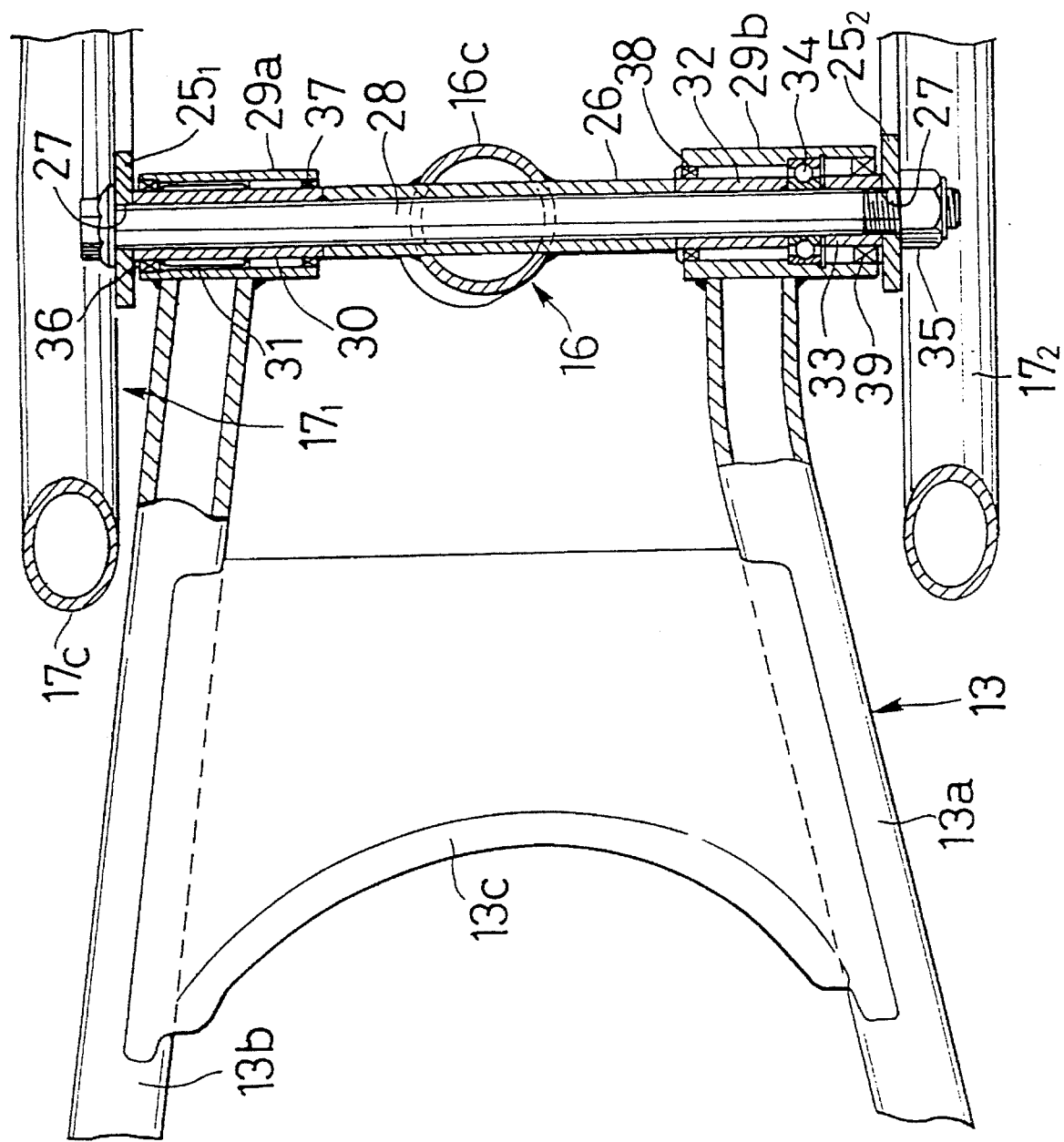
FIG. 6 is a cross section taken along the line 6—6 in FIG. 2, showing a swing arm supporting structure.
Figure 7:
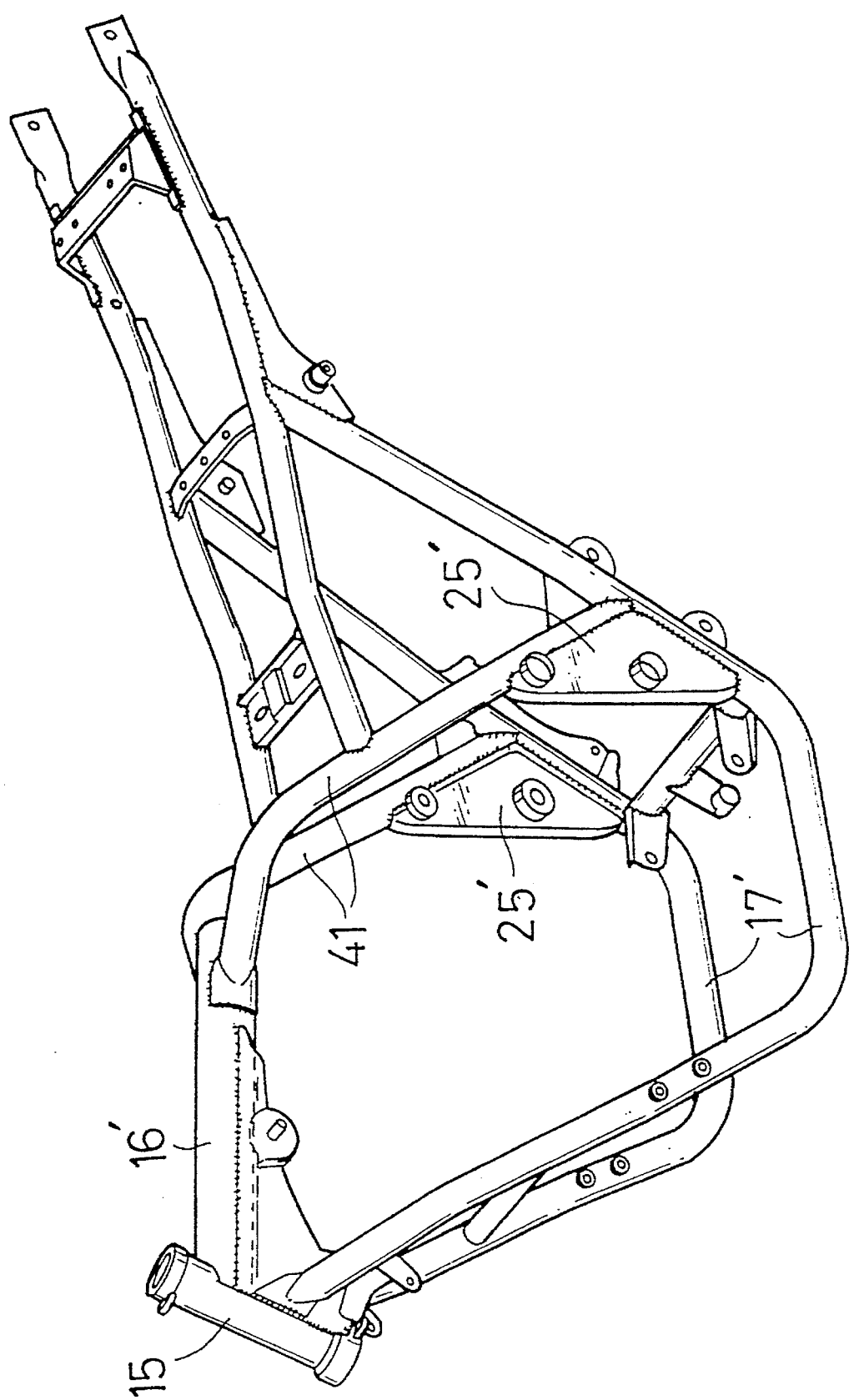
FIG. 7 is a perspective view showing a body frame of the prior art.

Referring to FIG. 6, the swing arm 13 is composed of a pair of left and right arms 13a and 13b and a connecting plate 13c connecting the arms 13a and 13b together. The front ends of the arms 13a and 13b are located between the supporting sleeve 26 and the left supporting plate $25_1$ and between the supporting sleeve 26 and the right supporting plate $25_2$, respectively. The arms 13a and 13b are pivotably supported by a bolt 28 as a pivot shaft provided between the supporting plates $25_1$ and $25_2$. More specifically, cylindrical specifically, cylindrical members 29a and 29b are aligned with each other and welded to the front ends of the arms 13a and 13b, respectively. A first sleeve 30 having the same diameter as that of the supporting sleeve 26 is located between one end of the supporting sleeve 26 and the supporting plate $25_1$. A needle bearing 31 is interposed between the first sleeve 30 and the cylindrical member 29a. Further, a second sleeve 32, having the same diameter as that of the supporting sleeve 26, is located to abut against the other end of the supporting sleeve 26. A third sleeve 33, having the same diameter as that of the supporting sleeve 26, is located to abut against an inner surface of the supporting plate $25_2$. An inner lace of a ball bearing 34 is interposed between the second sleeve 32 and the third sleeve 33. The ball bearing 34 is interposed between the cylindrical member 29b and the bolt 28. Thus, the bolt 28 is inserted through the through hole 27 of the supporting plate $25_1$, the first sleeve 31, the supporting sleeve 26, the second sleeve 32, the inner lace of the ball bearing 34, the third sleeve 33, and the through hole 27 of the supporting plate $25_2$. A nut 35 is threadedly engaged with an end portion of the bolt 28 projecting from the supporting plate $25_2$. Then, the bolt 28 is fixed to both of the supporting plates $25_1$ and $25_2$ by tightening the nut 35.

Annular sealing members 36 and 37 are interposed between the first sleeve 30 and the cylindrical member 29a at both ends, so as to prevent dust from entering the needle bearing 31. Similarly, an annular sealing member 38 is interposed between the second sleeve 32 at its outer end and the cylindrical member 29b, and an annular sealing member 39 is interposed between the third sleeve 33 at its outer end and the cylindrical member 29b, so as to prevent dust from entering the ball bearing 34.

The operation of this preferred embodiment will now be described. As described above, the intermediate portions of the pair of cross pipes 23 and 24 extending laterally and vertically spaced from each other are welded to the downwardly extending portion 16c of the main pipe 16, and the pair of left and right supporting plates $25_1$ and $25_2$ are welded to both ends of each of the cross pipes 23 and 24. The swing arm 13 is pivotably supported by the bolt 28 extending between the supporting plates $25_1$ and $25_2$. In mounting the bolt 28 between the supporting plates $25_1$ and $25_2$ and shaft working for pivotal connection of the front ends of the swing arm 13 to the bolt 28, it is only necessary to preliminarily connect the supporting plates $25_1$ and $25_2$ through the cross pipes 23 and 24 to the single main pipe 16. After completing the shaft working for the connection of the swing arm 13, the down tubes $17_1$ and $17_2$ may be connected to the supporting plates $25_1$ and $25_2$. Accordingly, of all parts of the body frame 11, the main pipe 16, the cross pipes 23 and 24, the supporting sleeve 26, and the supporting plates $25_1$ and $25_2$ constitute a unit to be handled in a shaft working for the connection of the swing arm 13. Thus, the unit to be handled in the shaft working for the connection of the swing arm 13 can be made relatively small in size, and the operation for the shaft working for the connection of the swing arm can, therefore, be made easy.

Furthermore, the unit for pivotably supporting the swing arm 13 to the body frame 11 is composed of the single main pipe 16, the pair of cross pipes 23 and 24, the pair of supporting plates $25_1$ and $25_2$, and the supporting sleeve 26. Accordingly, not only the number of parts can be made relatively small in size, but also a welding length can be reduced due to the reduction in the number of parts.

Further, since the supporting plates $25_1$ and $25_2$ are flat, they can be flexed so as to be closely fitted with the outer ends of the first and third sleeves 30 and 33 when the nut 35 is tightened to the bolt 28 in the condition where the front ends of the swing arm 13 are interposed between the supporting plates $25_1$ and $25_2$. Accordingly, this is advantageous in rigidity or in prevention of loosening of the nut 35. Moreover, rigidity balance can be adjusted only by adjusting the thickness of each plate.

The present invention may be applied to a three-wheeled automotive vehicle.

As described above, the present invention is characterized in that the body frame has a single main pipe comprising a rearwardly extending portion located over the engine and extending rearwardly from the head pipe, a bent portion extending from a rear end of the rearwardly extending portion, and a downwardly extending portion located behind the engine and extending downwardly from the bent portion. A pair of cross pipes extend laterally and are vertically spaced from each other and connected at their intermediate portions to the downwardly extending portion of the main pipe. A pair of supporting plates are located so as to be interpose therebetween the downwardly extending portion of the main pipe which are connected to both ends of each of the cross pipes. The front end of the swing arm is pivotably supported to a pivot shaft located between the cross pipes and extending between the supporting plates. Accordingly, a portion of the body frame to be handled in the shaft working for the connection of the swing arm can be composed of a minimum number of parts, that is, the main pipe, the pair of cross pipes, and the pair of supporting plates. Further, this portion to be handled in shaft working for the connection of the swing arm can be made relatively small in size. As a result, the operation for the shaft working for the connection of the swing arm can be made easy, and a welding length can be reduced due to the reduction in number of parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a motorcycle having an engine mounted thereon comprising:

a body frame having a front end provided with a head pipe for supporting a front suspension;

a swing arm for supporting a rear wheel being pivotably supported at a front end of the swing arm to a rear portion of said body frame at a position behind said engine;

said body frame includes a single main pipe having a rearwardly extending portion located over said engine and extending rearwardly from said head pipe, a bent portion extending from a rear end of said rearwardly extending portion, and a downwardly extending portion located behind said engine and extending downwardly from said bent portion;

a pair of laterally extending cross pipes being vertically spaced from each other are connected at an intermediate portion of each cross pipe to said downwardly extending portion of said main pipe;

a pair of supporting plates positioned to be disposed adjacent to said downwardly extending portion of said main pipe and each said supporting plate being connected to at least one of a first end and a second end of each of said cross pipes; and said front end of said swing arm being pivotably supported to a pivot shaft located between said cross pipes and extending between said supporting plates.

2. The frame structure according to claim 1, and further including a reinforcing gusset disposed between said head pipe and said main pipe.

3. The frame structure according to claim 1, and further including right and left down tubes being connected to said head pipe at a first end thereof and extending in front of and subsequently beneath said engine, said supporting plates being secured to at least one of a rear portion of said right and left down tubes.

4. The frame structure according to claim 3, and further including a pair of seat rails being disposed behind and secured to said bent portion of said main pipe, said right and left down tubes including a second end thereof being connected to at least one of said pair of seat rails.

5. The frame structure according to claim 1, wherein said pivot shaft includes a supporting sleeve of a predetermined diameter being less than a predetermined diameter of said downwardly extending main pipe and extending through a thickness of said downwardly extending main pipe.

6. The frame structure according to claim 5, wherein said swing arm includes a right arm and a left arm, cylindrical members are affixed to a first end of each of said right arm and said left arm of said swing arm, a first sleeve is disposed within the cylindrical member affixed to said first end of said right arm, said first sleeve extending between said pivot shaft and one of said support plates, a second sleeve is disposed within the cylindrical member affixed to said first end of said left arm, said second sleeve extending between said pivot shaft and the other of said support plates, a bolt extending between said pair of supporting plates and being within said first sleeve, said pivot shaft and said second sleeve for mounting the members relative to each other.

7. The frame structure according to claim 6, and further including a bearing being disposed between at least one of said first sleeve and said cylindrical member affixed to said first end of said right arm and said second sleeve and said cylindrical member affixed to said first end of said left arm.

8. The frame structure according to claim 7, and further including annular sealing members disposed between said first sleeve and the cylindrical member affixed to said first end of said right arm.

9. The frame structure according to claim 7, and further including a third sleeve positioned adjacent to said second sleeve with said bearing being disposed therebetween.

10. The frame structure according to claim 9, and further including an annular sealing member disposed between said third sleeve and the cylindrical member affixed to said first end of said left arm and an annular sealing member disposed between said second sleeve and the cylindrical member affixed to said first end of said left arm.

11. A frame structure for a motorcycle comprising:

a body frame having a front end provided with a head member for supporting a front suspension;

a swing arm for supporting a rear wheel being pivotably supported at a front end of the swing arm to a rear portion of said body frame;

said body frame includes a single main support having a rearwardly extending portion extending rearwardly from said head member, a bent portion extending from a rear end of said rearwardly extending portion, and a downwardly extending portion extending downwardly from said bent portion;

a pair of laterally extending cross members being vertically spaced from each other and connected at an intermediate portion of each cross member to said downwardly extending portion of said main support;

a pair of supporting plates positioned to be disposed adjacent to said downwardly extending portion of said main support and each said supporting plate being connected to at least one of a first end and a second end of each of said cross members; and said front end of said swing arm being pivotably supported to a pivot member located between said cross members and extending between said supporting plates.

12. The frame structure according to claim 11, and further including a reinforcing gusset disposed between said head member and said main support.

13. The frame structure according to claim 11, and further including right and left down supports being connected to said head member at a first end thereof and extending downwardly and rearwardly, said supporting plates being secured to at least one of a rear portion of said right and left down supports.

14. The frame structure according to claim 13, and further including a pair of seat rails being disposed behind and secured to said bent portion of said main support, said right and left down supports including a second end thereof being connected to at least one of said pair of seat rails.

15. The frame structure according to claim 11, wherein said pivot member is a pivot shaft having a predetermined diameter being less than a predetermined thickness of said downwardly extending main support and extending through a thickness of said downwardly extending main support.

16. The frame structure according to claim 15, wherein said swing arm includes a right arm and a left arm, cylindrical members are affixed to a first end of each of said right arm and said left arm of said swing arm, a first sleeve is disposed within the cylindrical member affixed to said first end of said right arm, said first sleeve extending between said pivot shaft and one of said support plates, a second sleeve is disposed within the cylindrical member affixed to said first end of said left arm, said second sleeve extending between said pivot shaft and the other of said support plates and a bolt extending between said pair of supporting plates and being within said first sleeve, said pivot shaft and said second sleeve for mounting the members relative to each other.

17. The frame structure according to claim 16, and further including a bearing being disposed between at least one of said first sleeve and said cylindrical member affixed to said first end of said right arm and said second sleeve and said cylindrical member affixed to said first end of said left arm.

18. The frame structure according to claim 17, and further including annular sealing members disposed between said first sleeve and the cylindrical member affixed to said first end of said right arm.

19. The frame structure according to claim 17, and further including a third sleeve positioned adjacent to said second sleeve with said bearing being disposed therebetween.

20. The frame structure according to claim 19, and further including an annular sealing member disposed between said third sleeve and the cylindrical member affixed to said first end of said left arm and an annular sealing member disposed between said second sleeve and the cylindrical member affixed to said first end of said left arm.

* * * * *